E. Pollard,
Meat Tenderer,
Nº 22,839. Patented Feb. 1, 1859.

Witnesses:
William J. Gearon
Barlw. J. Hackett.

Inventor.
Ezra Pollard.

UNITED STATES PATENT OFFICE.

EZRA POLLARD, OF ALBANY, NEW YORK, ASSIGNOR TO HIMSELF AND JOSHUA GRAY, OF WESTFIELD, MASSACHUSETTS.

IMPROVED MEAT-CLEAVER.

Specification forming part of Letters Patent No. 22,839, dated February 1, 1859.

*To all whom it may concern:*

Be it known that I, EZRA POLLARD, of Albany, in the county of Albany and State of New York, have invented a new and useful Improvement by Combining a Meat-Masticator with an Ax or Cleaver, thereby forming a valuable and convenient instrument for kitchen purposes, of which the following is a specification.

The nature of my improvement consists in casting a meat-masticator at one end of a stock and a cleaver or ax on the other end, and combining both to the same stock, which is formed with an eye to receive a handle, so that either can be used at pleasure, thereby forming a valuable improvement as a kitchen-instrument. By using the masticator the meat is punctuated, thereby cutting the grain and making it tender, and the cleaver or ax can be instantly brought into use for the purpose of cutting meat or bone by simply turning the handle.

Having thus shown the novelty of my invention for which I wish to secure Letters Patent, I will now proceed to describe it, and certify that the accompanying combined masticator and cleaver or ax, together with the drawings and specifications, are a full and correct representation of the same, like letters corresponding with like parts.

Figure 2:
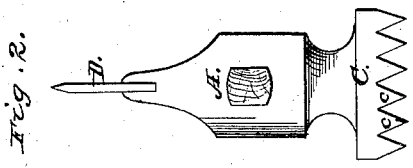
Figure 1:
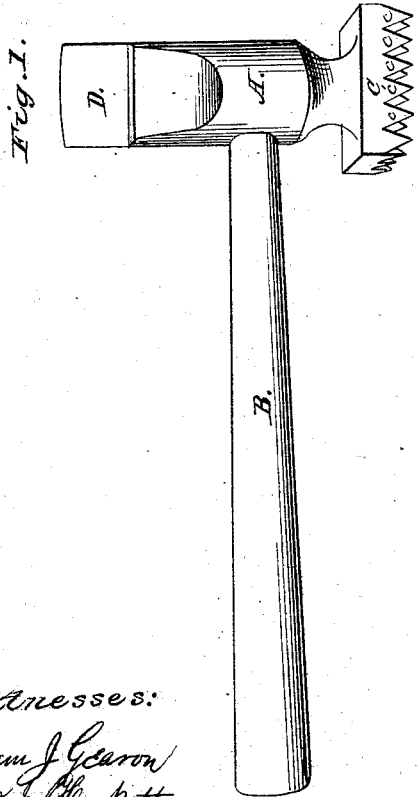
Figure 3:
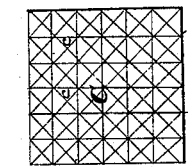

Figure 1 represents a perspective view of the combined meat-masticator and cleaver or ax. Fig. 2 represents an end view of the same. Fig. 3 represents a plan of the same, showing the teeth on the face of the masticator.

A, Figs. 1 and 2, represents a cast-iron stock, on the lower end of which is formed a meat-masticator C, which is provided with a series of teeth $c$ $c$, the lower ends of which form points. The upper end of the stock A is cast onto a steel plate D, which forms a cleaver or ax. An eye is also cast into the stock A, to receive the handle B.

I do not claim a masticator for pounding meat separately, for that or its equivalent has been used before; neither do I claim the cleaver or ax when taken separately; but

I claim—

The meat-masticator C, in combination with the cleaver D and handle B, substantially as and for the purposes specified.

EZRA POLLARD.

Witnesses:
WILLIAM J. GEARON,
BASTN. J. HACKETT.